No. 871,259. PATENTED NOV. 19, 1907.
J. J. DORMAN.
PLOW POINT FASTENER.
APPLICATION FILED APR. 8, 1907.
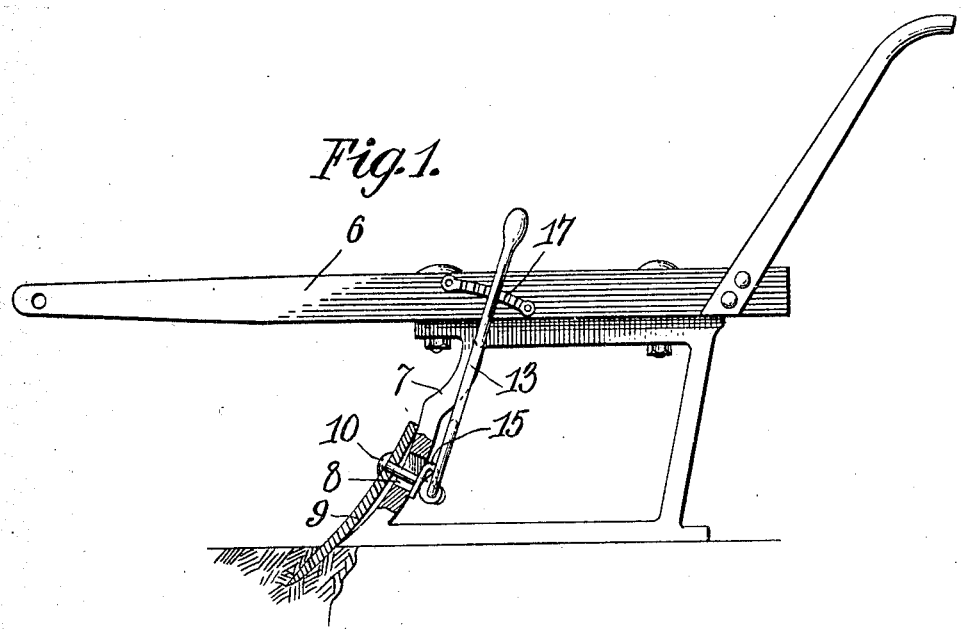
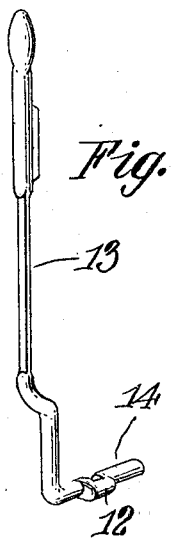
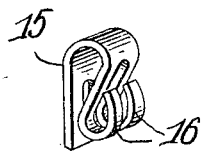
Witnesses
C. E. Smith.
Geo. E. Tew.
John J. Dorman
Inventor
By Milo B. Stevens
Attorneys

UNITED STATES PATENT OFFICE.

JOHN JAMES DORMAN, OF RED SPRINGS, NORTH CAROLINA.

PLOW-POINT FASTENER.

No. 871,259.  Specification of Letters Patent.  Patented Nov. 19, 1907.

Application filed April 8, 1907. Serial No. 367,040.

*To all whom it may concern:*

Be it known that I, JOHN J. DORMAN, a citizen of the United States, residing at Red Springs, in the county of Robeson and State of North Carolina, have invented certain new and useful Improvements in Plow-Point Fasteners, of which the following is a specification.

This invention is a device intended to be used to fasten or clamp the point or shovel of a plow to the stock or standard thereof. It is particularly useful in connection with shovel plows, and has for its object to provide an improved device whereby the adjustment of the plow may be varied quickly and easily, and the shovel or point firmly locked in adjusted position, and this without the use of a wrench or other tool.

The invention is illustrated in the accompanying drawings, in which

Figure 1 is a side elevation of a plow provided with the improvement. Fig. 2 is a perspective view of a cam or locking lever which clamps the parts together. Fig. 3 is a perspective view of a spring, forming part of the invention. Fig. 4 is a side view of the clamping bolt.

Referring specifically to the drawings, 6 indicates the beam, 7 the stock, and 9 the shovel of an ordinary shovel plow. The stock is slotted as indicated at 8, to allow the shovel to be adjusted for deep or shallow plowing. A bolt 10 extends through the shovel or plow point 9 and through the slot 8 and at its rear end has a hook 11 adapted to receive the cranked or off-set portion 12 formed at the lower end of a lever 13 which is bent at substantially a right angle, as at 14, to extend at its lower end crosswise through the hook 11. The part 12 acts as a cam, when the lever is swung in proper direction, and acts to strain the bolt and clamp the shovel securely to the stock.

In order to permit the necessary motion of the clamping lever a forked substantially S-shaped spring 15 is provided and located between the rear side of the stock and the off-set part 14 of the lever. The bolt extends through between the forks of the spring, and the off-set end of the lever extends across through the bends or hooks 16 at the outer end of the spring. This spring is quite heavy or stiff and will not yield under any ordinary pull or pressure on the plow point.

The lever 13 extends up beside the stock and at the top has an edge engageable in one of the notches of a rack 17 fastened to the side of the plow beam. The lever has sufficient lateral spring so that it may be disengaged from the notches by lateral pressure thereon, and will spring into engagement with the desired notch when released.

In order to release the bolt and allow the plow shovel to be raised or lowered the lever 13 is swung until the crank portion 12 is turned toward the head of the bolt. This eases off the bolt and allows the point to be raised and lowered to proper adjustment. Then it may be clamped or tightened by swinging the lever in the opposite position, to cause the crank part 12 to bear as a cam against the hook 11 and thereby strain the bolt. The lever is then caught in one of the notches of the rack and so held in locked or clamped position. The spring 15 is in compression between the plow stock and the cross piece of the lever and so holds the parts against looseness or accidental movement. It also prevents undue and unnecessary strain on the bolt in consequence of power applied to the lever. The spring retains itself in position by means of its shape and the fact that the branches pass on opposite sides of the bolt.

I claim:

1. The combination with a plow stock and point, of a bolt connecting the same and hooked at the end, and a cam bearing between the stock and the hook and adapted to be turned to tighten or loosen the bolt.

2. The combination with a plow stock and point, of a bolt connecting the same and hooked at the end, a lever having a cam engaged in the hook, to tighten or loosen the bolt, and a spring in compression between the stock and the cam.

3. The combination with a slotted plow stock and point, of a bolt connecting the point and extending through the slot and having a hooked end behind the stock, a lever having a laterally extending cam portion at its lower end extending through the hook, a spring in compression between the stock and said laterally-extending portion of the lever, and means to hold the lever in adjusted position.

4. The combination with a plow stock and point, of a bolt connecting the same and hooked at the inner end, a cam extending across within the hook, and a spring in compression between the cam and the stock, the spring having forks between which the bolt passes.

In testimony whereof I affix my signature, in presence of two witnesses.

JOHN JAMES DORMAN.

Witnesses:
DANIEL W. McNEIL,
J. ALLEN HUGGINS.